United States Patent
Shimomura (10) Patent No.: US 11,679,630 B2
(45) Date of Patent: Jun. 20, 2023

(54) PNEUMATIC TIRE

(71) Applicant: TOYO TIRE & RUBBER CO., LTD., Itami (JP)

(72) Inventor: Kazuo Shimomura, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 914 days.

(21) Appl. No.: 16/216,211

(22) Filed: Dec. 11, 2018

(65) Prior Publication Data

US 2019/0193466 A1 Jun. 27, 2019

(30) Foreign Application Priority Data

Dec. 27, 2017 (JP) ............................. JP2017-250787

(51) Int. Cl.
| | | |
|---|---|---|
| *B60C 15/06* | (2006.01) | |
| *B60C 15/024* | (2006.01) | |
| *B60C 15/00* | (2006.01) | |
| *B60C 13/02* | (2006.01) | |
| *B60C 9/02* | (2006.01) | |
| *B60C 9/04* | (2006.01) | |

(52) U.S. Cl.
CPC ...... *B60C 15/0628* (2013.01); *B60C 15/0045* (2013.01); *B60C 15/0242* (2013.01); *B60C 15/0653* (2013.01); *B60C 2009/0215* (2013.01); *B60C 2009/0491* (2013.01); *B60C 2015/0642* (2013.01); *B60C 2015/0664* (2013.01); *B60C 2015/0671* (2013.01); *B60C 2015/0675* (2013.01)

(58) Field of Classification Search
CPC .... B60C 2015/0671; B60C 2015/0675; B60C 9/07; B60C 15/0242
See application file for complete search history.

(56) References Cited

U.S. PATENT DOCUMENTS

| | | |
|---|---|---|
| 2004/0238094 A1 | 12/2004 | Kajita |
| 2013/0081746 A1 | 4/2013 | Yoshikawa |
| 2013/0118669 A1 | 5/2013 | Krietemeyer et al. |

FOREIGN PATENT DOCUMENTS

| | | |
|---|---|---|
| CN | 103917381 A | 7/2014 |
| JP | S61-105202 A | 5/1986 |
| JP | 2003-182318 A | 7/2003 |
| JP | 2004-352174 A | 12/2004 |
| JP | 2008-222072 A | 9/2008 |
| JP | 2011-93395 A | 5/2011 |

(Continued)

OTHER PUBLICATIONS

Office Action dated Mar. 2, 2021, issued in counterpart CN application No. 201811450774.9, with the English translation. (12 pages).

(Continued)

*Primary Examiner* — Adrienne C. Johnstone
(74) *Attorney, Agent, or Firm* — WHDA, LLP (57) ABSTRACT

A tire includes a tread portion, a sidewall portion, and a bead portion. The bead portion includes a bead core that extends continuously in an annular shape in a tire circumferential direction, and a bead filler disposed adjacent to the bead core and outside the bead core in a tire radial direction. Reinforcing cords are provided in the bead portion and the sidewall portion so as to be curved such that inclination angles of the reinforcing cords with respect to the tire circumferential direction gradually increase with nearness to an outside in the tire radial direction.

4 Claims, 9 Drawing Sheets

(56) References Cited

FOREIGN PATENT DOCUMENTS

| JP | 2012-106568 A | 6/2012 |
| JP | 2013-75549 A | 4/2013 |

OTHER PUBLICATIONS

Office Action dated Mar. 15, 2021, issued in counterpart DE application No. 102018131897.9, with the English translation. (12 pages).
Office Action dated Jul. 17, 2020, issued in counterpart CN application No. 201811450774.9, with English translation. (16 pages).
Office Action dated Sep. 14, 2021, issued in counterpart JP application No. 2017-250787, with English translation. (14 pages).
Office Action dated Jan. 25, 2022, issued in counterpart JP Application No. 2017-250787, with English translation. (12 pages).

Fig. 5   —COMPARATIVE—

Fig. 6 —COMPARATIVE—

Fig 7  —COMPARATIVE—

PNEUMATIC TIRE

CROSS-REFERENCE TO RELATED APPLICATIONS

This application claims priority of Japanese Patent Application No.: 2017-250787 filed on Dec. 27, 2017, the content of which is incorporated herein by reference.

BACKGROUND OF THE INVENTION

Technical Field

The present invention relates to a pneumatic tire.

Related Art

As a tire for an automobile or the like, a pneumatic tire capable of achieving high steering stability has been demanded. Particularly, in areas where high-speed traveling is permitted, such as European countries, a high-gravity (G) load is applied to the pneumatic tire during high speed traveling. Accordingly, a design capable of securing high steering stability even under a high-G load has been demanded.

The pneumatic tire preferably has high rigidity to improve steering stability. For example, JP 2011-93395 A, JP 2003-182318 A, and JP 2008-222072 A each disclose a tire which includes a reinforcing cord embedded in each of a sidewall portion and a bead portion to improve rigidity of the sidewall portion and the bead portion.

SUMMARY

The reinforcing cord which increases rigidity is effective in improvement of steering stability. However, the reinforcing cord produces uneven rigidity distribution in the sidewall portion and the bead portion, and therefore riding comfort may deteriorate. In addition, when rigidities of the sidewall portion and the bead portion are excessively raised by the reinforcing cord, a contact length in a tire circumferential direction may decrease by reduction of a flexibility amount of the pneumatic tire. When the contact length decreases, a ground contact pressure increases. In this case, a shock absorbing property may deteriorate, and therefore riding comfort may deteriorate.

An object to be achieved by the present invention is to improve both steering stability and riding comfort of a pneumatic tire.

A pneumatic tire according to the present invention includes:
a tread portion that including a tread surface;
a pair of sidewall portions that respectively extend inward in a tire radial direction from both sides of the tread portion in a tire width direction; and
a pair of bead portions each of which includes a bead core that is elongated continuously to an inside of the sidewall portion in the tire radial direction and extends continuously in an annular shape in a tire circumferential direction, and a bead filler disposed adjacent to the bead core and outside the bead core in the tire radial direction,
wherein reinforcing cords are provided in the bead portions and the sidewall portions so as to be curved such that inclination angles of the reinforcing cords with respect to the tire circumferential direction gradually increase with nearness to an outside in the tire radial direction.

According to this configuration, the reinforcing cords are disposed such that the inclination angles of the reinforcing cords with respect to the tire circumferential direction increase in an outer portion in the tire radial direction of the pneumatic tire (hereinafter also referred to as outer diameter portion), and decrease in an inner portion (hereinafter also referred to as inner diameter portion). The reinforcing cords are deformed more greatly when a force is applied in a bending direction than in an expansion/contraction direction (longitudinal direction). In this case, rigidity at the portion including the reinforcing cords can be raised more greatly in the longitudinal direction than in the bending direction. In the above configuration, the inclination angles are varied so that the reinforcing cords extend in the tire radial direction in the outer diameter portion, and extend in the tire circumferential direction in the inner diameter portion. Accordingly, rigidity (radial rigidity) in the tire radial direction more greatly increases in the outer diameter portion than in the inner diameter portion, while rigidity in the tire circumferential direction (circumferential rigidity) more greatly increases in the inner diameter portion than in the outer diameter portion. In particular, radial rigidity of the outer diameter portion constituting the tread portion greatly contributes to steering stability. Accordingly, steering stability improves with the rise of radial rigidity of the outer diameter portion. Moreover, the respective reinforcing cords are curved so that the inclination angles gradually increase. This arrangement prevents uneven rigidity distribution caused by the reinforcing cords, thereby improving riding comfort. In addition, circumferential rigidity in the outer diameter portion is prevented from becoming excessively high, and therefore the contact length in the tire circumferential direction is prevented from becoming smaller. Accordingly, ground contact pressure is prevented from increasing, and riding comfort further improves. The inclination angle with respect to the tire circumferential direction refers to the inclination angle of each of the reinforcing cords with respect to the tire circumferential direction at an inner end in the tire radial direction TR.

The inclination angles may include angles of 45 degrees or larger on an outside in the tire radial direction.

According to this configuration, a certain level or higher of radial rigidity, and a certain level or lower of circumferential rigidity can be securely acquired in the outer diameter portion. Accordingly, necessary steering stability and riding comfort can be securely obtained.

The inclination angles may include angles of smaller than 45 degrees on an inside in the tire radial direction.

According to this configuration, a certain level or lower of radial rigidity can be securely acquired in the inner diameter portion. Accordingly, deterioration of riding comfort caused by excessive increase in radial rigidity is avoidable.

The sidewall portion may further include a rim protector that has a top portion protruding in the tire width direction and continuously formed in an annular shape in the tire circumferential direction. A boundary of the inclination angles between the outside and the inside in the tire radial direction may be located at the top portion or the rim protector.

According to this configuration, radial rigidity of a portion having low radial rigidity can be efficiently raised by the reinforcing cords. High rigidity components such as the bead filler and the bead core are disposed on the inner diameter portion with respect to the top portion of the rim protector so that radial rigidity at the inner diameter portion is relatively high. On the other hand, radial rigidity of the outer diameter portion not including such high rigidity components is relatively low. Accordingly, radial rigidity at the portion having relatively low radial rigidity can be efficiently raised by setting the inclination angles to a predetermined value or larger on the outside in the tire radial direction with respect to a boundary portion located at the top portion of the rim protector as a boundary for the inclination angles, and setting the inclination angles to a predetermined angle or smaller on the inside in the tire radial direction. In this manner, steering stability efficiently improves.

The inclination angles may vary through 40 degrees or larger.

According to this configuration, at least a certain difference in radial rigidity can be produced between the outer diameter portion and the inner diameter portion. Similarly, at least a certain difference in circumferential rigidity can be produced between the outer diameter portion and the inner diameter portion. In this case, a certain level or higher of radial rigidity and a certain level or lower of circumferential rigidity can be securely acquired in the outer diameter portion. In addition, a certain level or lower of radial rigidity can be acquired in the inner diameter portion. Accordingly, steering stability and riding comfort further securely improve.

An outer end of each of the reinforcing cords in the tire radial direction may be disposed in a range from 30% inclusive to 70% inclusive of a tire sectional height.

According to this configuration, the reinforcing cords can be disposed at appropriate positions for which improvement in radial rigidity is required. A range smaller than 30%, which is out of the range of the reinforcing cords described above, is a range originally having a high radial rigidity achieved by the bead core, the bead filler and the like. Accordingly, even when the reinforcing cords are disposed only in this range, necessary radial rigidity cannot be acquired in the outer diameter portion. When the reinforcing cords are disposed in a range larger than 70% described above, radial rigidity excessively increases. In this case, riding comfort may deteriorate. Accordingly, when the reinforcing cords are disposed within the appropriate range from 30% inclusive to 70% inclusive, as a range other than the foregoing ranges, appropriate radial rigidity can be acquired.

At least one carcass ply folded toward an outside from an inside in the tire width direction, and disposed around the bead core and the bead filler may be further provided.

An arrangement may be made in an order of a folded end of the carcass ply, outer ends of the reinforcing cords, and an outer end of the bead filler from an outside to an inside in the tire radial direction.

According to this configuration, radial rigidity increases stepwise from the outside toward the inside in the tire radial direction. This stepwise rigidity change prevents a considerable local rigidity change, that is, prevents uneven rigidity distribution, thereby improving riding comfort.

A belt that extends in the tire width direction inside the tread portion may be further provided. A height of the folded end of the carcass ply in the tire radial direction may be 1.05 times or more than a height of the outer end of each of the reinforcing cords in the tire radial direction. The folded end of the carcass ply and the belt partially may overlap with each other. An overlapping amount between the folded end of the carcass ply and the belt may be 20 mm or smaller.

According to this configuration, the folded end of the carcass ply and the outer ends of the reinforcing cords do not overlap with each other under the specification of 1.05 times or more as described above. Accordingly, the stepwise rigidity change is further securely achievable. Moreover, the overlapping amount between the carcass ply and the belt is limited to a certain value or smaller. Accordingly, the length of the carcass ply does not become large, and therefore the weight and cost can decrease.

According to the pneumatic tire of the present invention, preferable steering stability and riding comfort can be both achieved by providing the reinforcing cords in such a manner that the inclination angles of the reinforcing cords with respect to the tire circumferential direction gradually increase with nearness to the outside in the tire radial direction.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Embodiments of the present invention will be hereinafter described with reference to the accompanying drawings.

Figure 1:
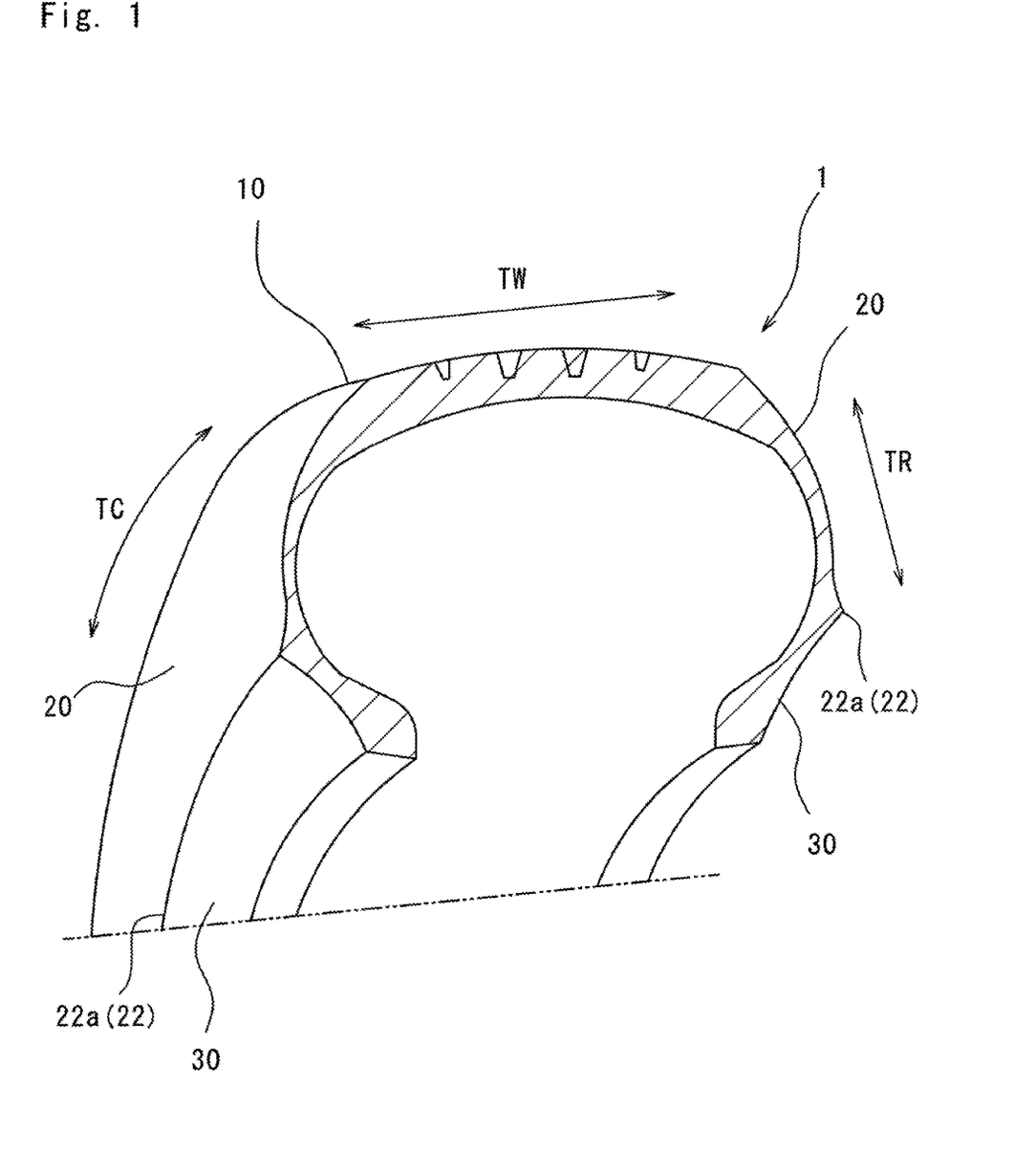
FIG. 1 is a perspective partial view including a cross section of a pneumatic tire in a tire meridian direction according to an embodiment of the present invention.

FIG. 1 is a schematic cross-sectional view of a pneumatic tire 1 (hereinafter also abbreviated as tire 1) in a tire meridian direction according to the present embodiment. The tire 1 is attached to a rim (not shown) to form an air layer between the tire 1 and the rim. The tire 1 includes a tread portion 10 including a tread surface, a pair of sidewall portions 20 respectively extending inward in a tire radial direction TR from both sides of the tread portion 10 in a tire width direction TW, and a pair of bead portions 30 being elongated continuously to an inside of the sidewall portions 20 in the tire radial direction TR and assembled to the rim.

Figure 2:
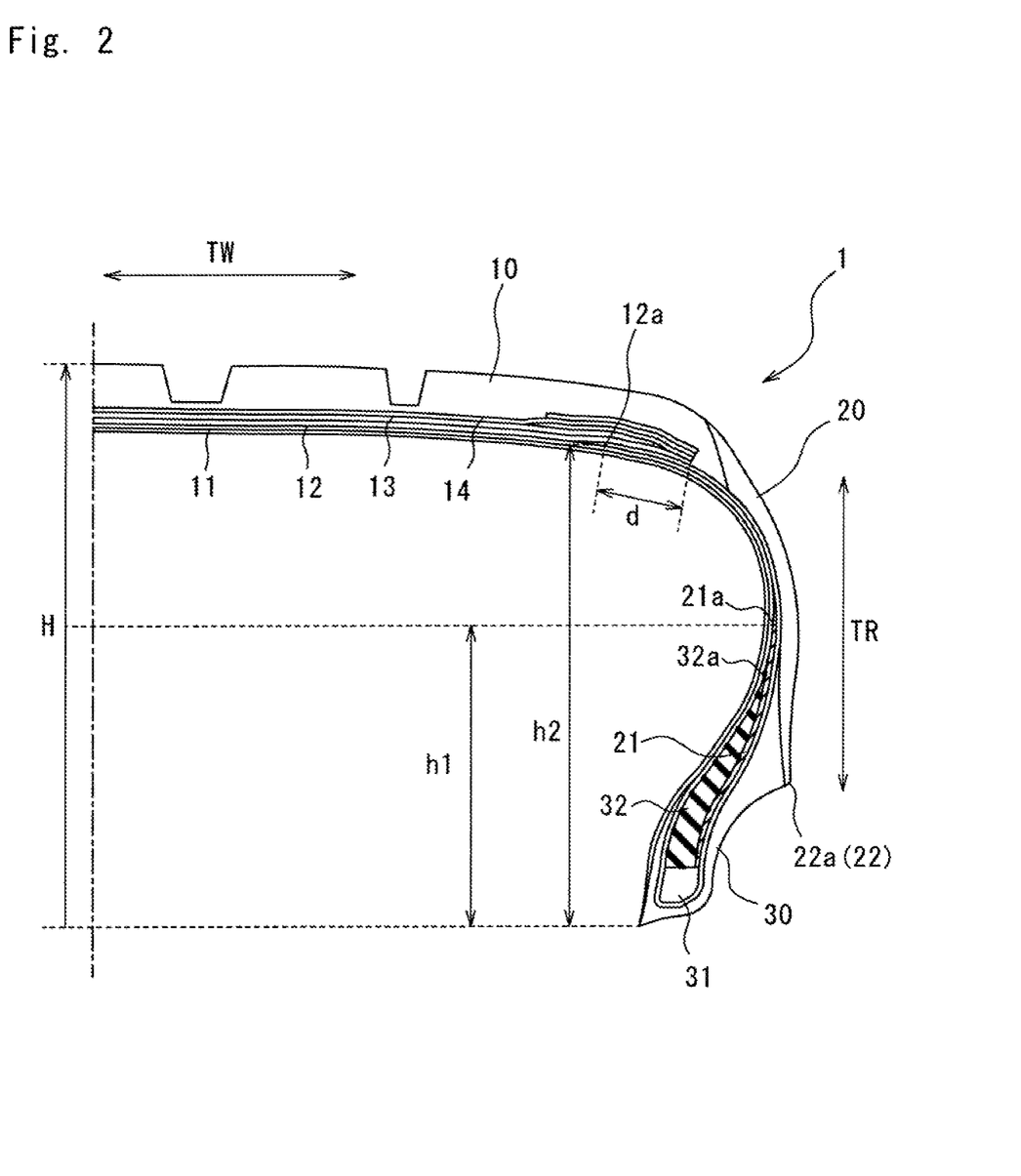
FIG. 2 is an enlarged partial view of the cross section of FIG. 1.

FIG. 2 is an enlarged partial view of the cross section of FIG. 1.

A carcass ply 12, a belt 13, and a tread reinforcing layer 14 are embedded in the tread portion 10 in a direction toward the outside from an inner liner 11 located inside in the tire radial direction TR. Both end portions of the carcass ply 12 in the tire width direction TW extend toward the sidewall portions 20 and the bead portions 30.

The carcass ply 12 and reinforcing cords 21 made of steel are embedded in each of the sidewall portions 20. The carcass ply 12 and the reinforcing cords 21 in the sidewall portion 20 extend substantially in the tire radial direction TR. The sidewall portion 20 further includes a rim protector 22 which has a top portion 22a protruding outward in the tire width direction TW, and continuously extends in an annular shape in a tire circumferential direction TC. The rim protector 22 has a function of protecting the rim (not shown) from external damage. As shown in FIG. 2, the rim protector 22 in cross-section tapers to an outermost point in the tire width direction from an outer surface of the sidewall portion 20, the outermost point being the top portion 22a.

A bead core 31 and a bead filler 32 each continuously extending in an annular shape in the tire circumferential direction TC are embedded in each of the bead portions 30. The bead core 31 and the bead filler 32 are high rigidity portions for assembling the bead portion 30 to the rim (not shown). In addition, the carcass ply 12 is disposed inside the bead portion 30 in such a condition as to fold a region around the bead core 31 and the bead filler 32 in a direction from the inside toward the outside. An end portion 12a of the folded carcass ply 12 extends beyond the bead portion 30 and the sidewall portion 20 to the tread portion 10, and overlaps with the belt 13. Specifically, an overlapping amount d between the folded carcass ply 12 and the belt 13 is 12 mm. The overlapping amount d is preferably in a range from 5 mm inclusive to 20 mm inclusive. However, the folded carcass ply 12 and the belt 13 do not necessarily overlap each other.

The reinforcing cords 21 are disposed in the bead portion 30 between the folded carcass ply 12 and the bead filler 32. One end (lower end in figure) of each of the reinforcing cords 21 is connected to the bead core 31, while an opposite end (upper end in figure) extends to the sidewall portion 20 and is covered by rubber coating to constitute a side reinforcing layer. More, specifically, the opposite end (outer end in tire radial direction TR) of each of the reinforcing cords 21 is disposed at a height h1 of about 55% of a tire sectional height H (h1=0.55H). The opposite end (outer end in tire radial direction TR) of each of the reinforcing cords 21 is preferably disposed in a range from 30% inclusive to 70% inclusive of the tire sectional height H (0.3H≤h1≤0.7H).

As for a positional relationship between the respective parts, folded end 12a of the carcass ply 12, an outer end 21a of each of the reinforcing cords 21, and an outer end 32a of the bead filler 32 are disposed in this order from the outside to the inside in the tire radial direction TR. Particularly in this positional relationship, a height h2 of the folded end 12a of the carcass ply 12 the tire radial direction TR is preferably 1.05 times or more than the height h1 of the outer end 21a of each of the reinforcing cords 21 in the tire radial direction TR (h2≥1.05h1). According to the present embodiment, the height h2 is about 1.5 times larger than the height h1 (h2=1.5h1).

As for a positional relationship between the respective parts in the tire width direction TW, the carcass ply 12 (after folding), the reinforcing cords 21, the bead filler 32, and the carcass ply 12 (before folding are disposed in this order from the outside to the inside. However, the respective parts are not required to be disposed in this manner. For example, the reinforcing cords 21 may be arranged in following four ways, (1) inside the carcass ply 12 (before folding), (2) between the carcass ply 12 (before folding) and the bead filler 32, (3) between the bead filler 32 and the carcass ply 12 (after folding) as shown in FIGS. 2, and (4) outside the carcass ply 12 (after folding). While one carcass ply 12 is provided in the present embodiment, two or more carcass plies 12 may be provided. In this case, the reinforcing cords 21 can be similarly disposed at any positions in the tire width direction TW.

In the present embodiment, the tread portion 10, the sidewall portion 20, and the bead portion 30 are made of different rubber materials. Accordingly, lines dividing the respective portions 10, 20, and 30 in FIG. 2 indicate boundaries between different materials each constituting the corresponding portion 10, 20, or 30, and therefore the respective portions 10, 20, and 30 are sectioned by the corresponding lines.

Figure 3:
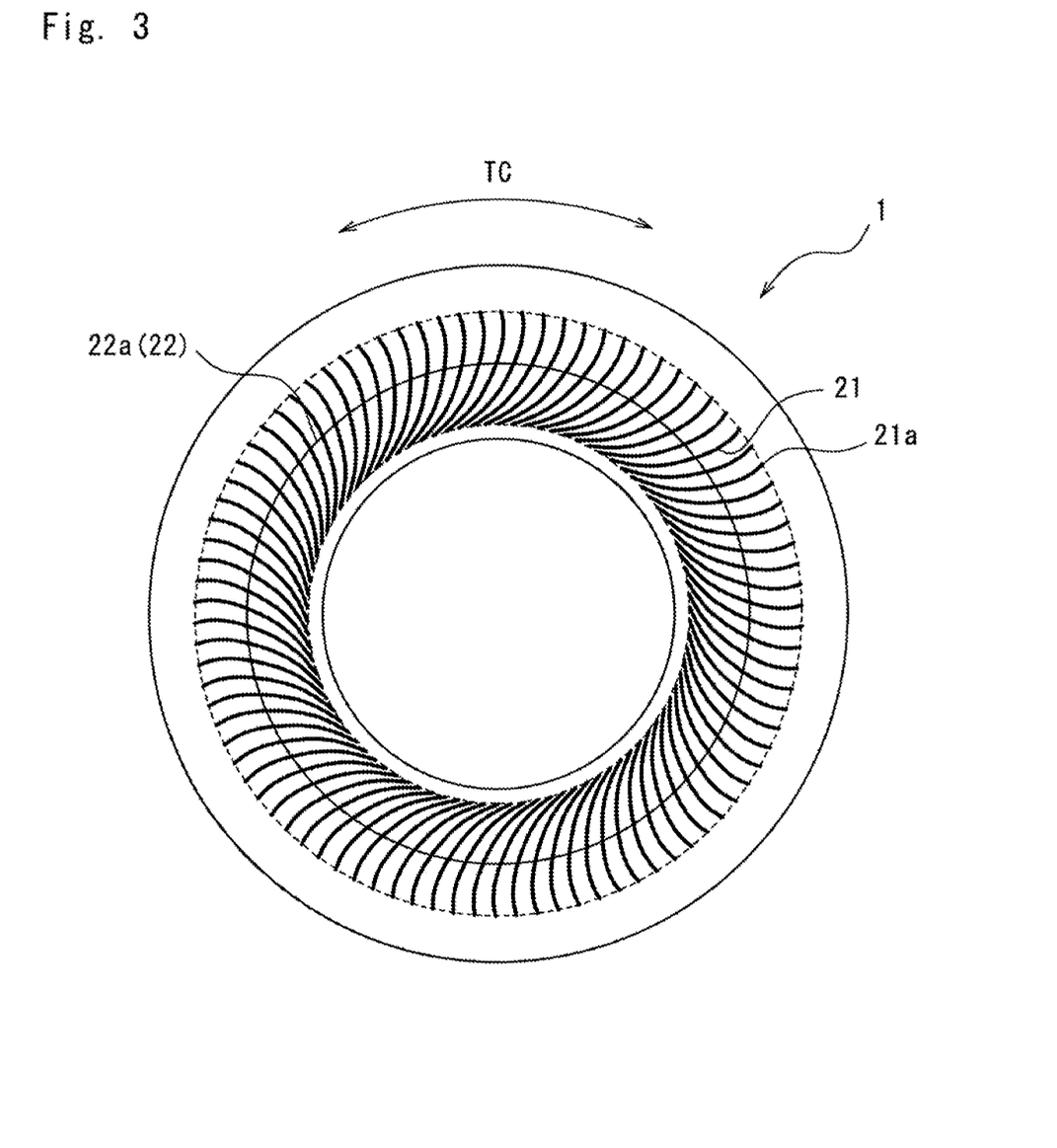
FIG. 3 is a schematic side view of the pneumatic tire showing an arrangement of reinforcing cords.
Figure 4:
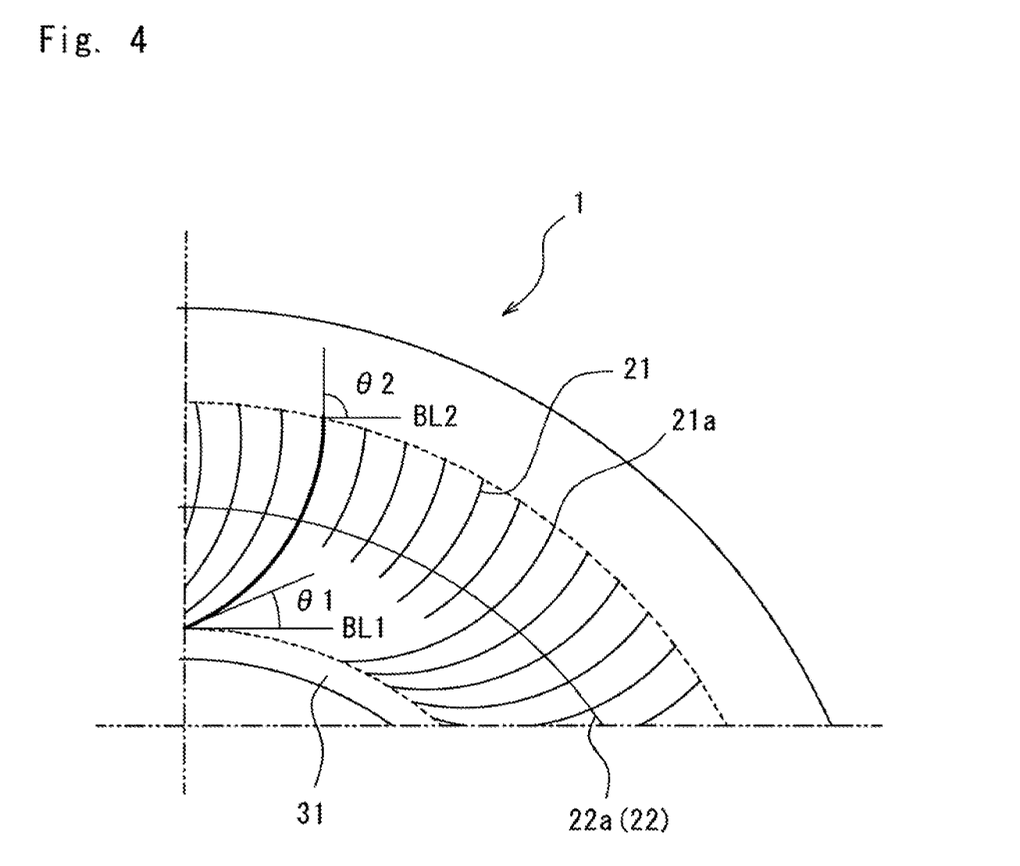
FIG. 4 is an enlarged partial view of FIG. 3.
Figure 5:
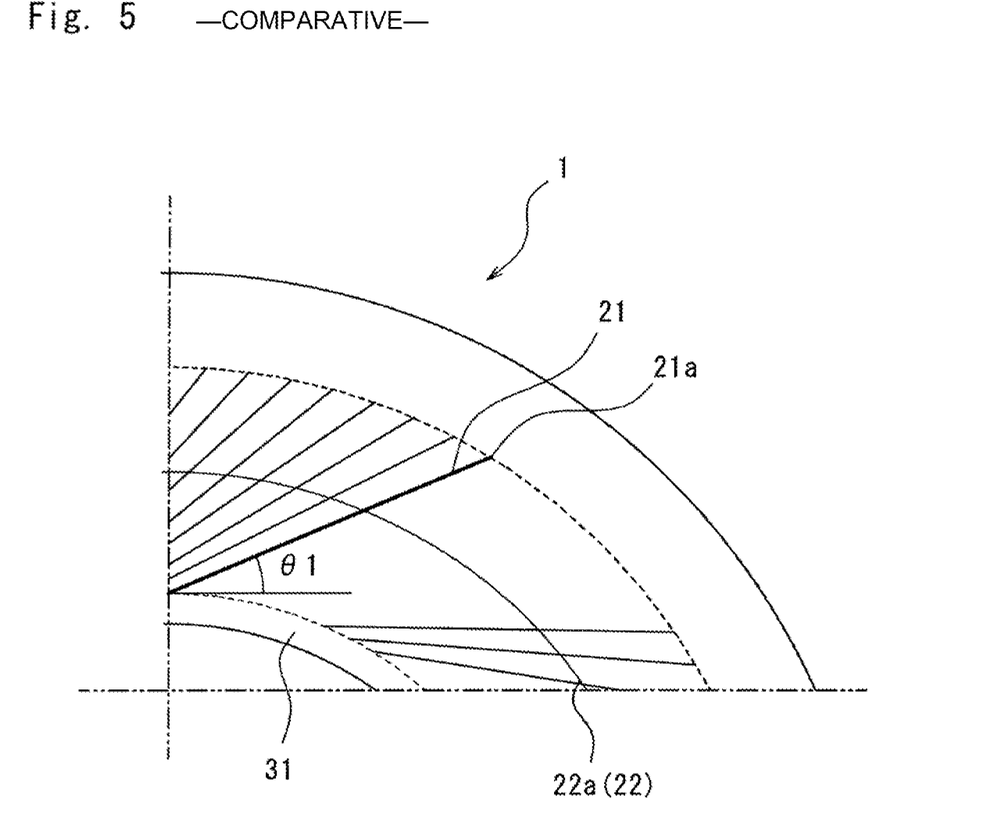
FIG. 5 is a schematic partial side view of a pneumatic tire according to Comparative Example 1.
Figure 6:
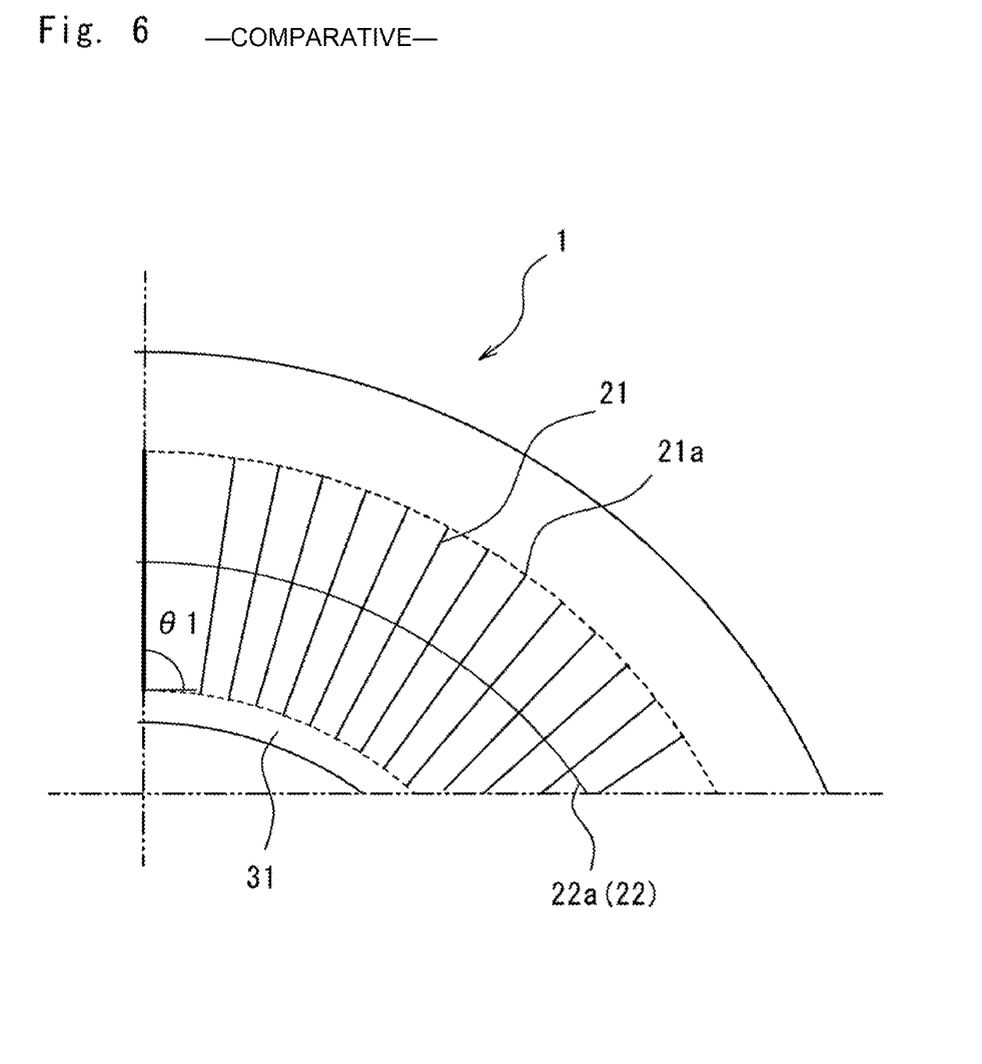
FIG. 6 is a schematic partial side view of a pneumatic tire according to Comparative Example 2.
Figure 7:
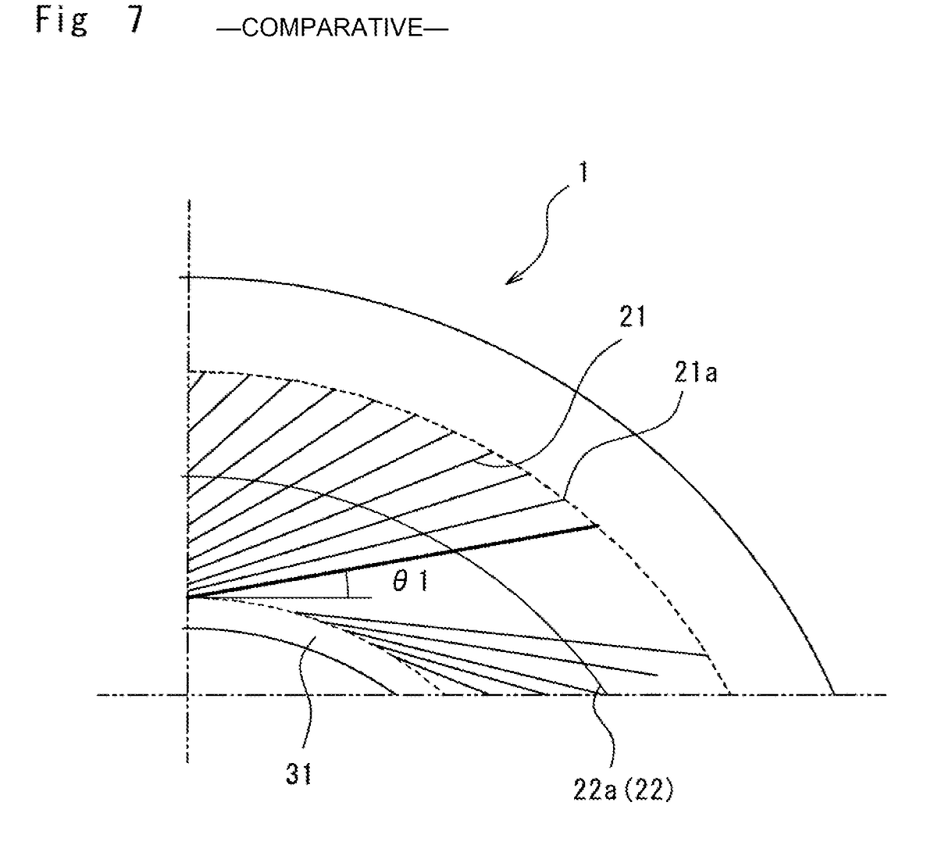
FIG. 7 is a schematic partial side view of a pneumatic tire according to Comparative Example 3.
Figure 8:
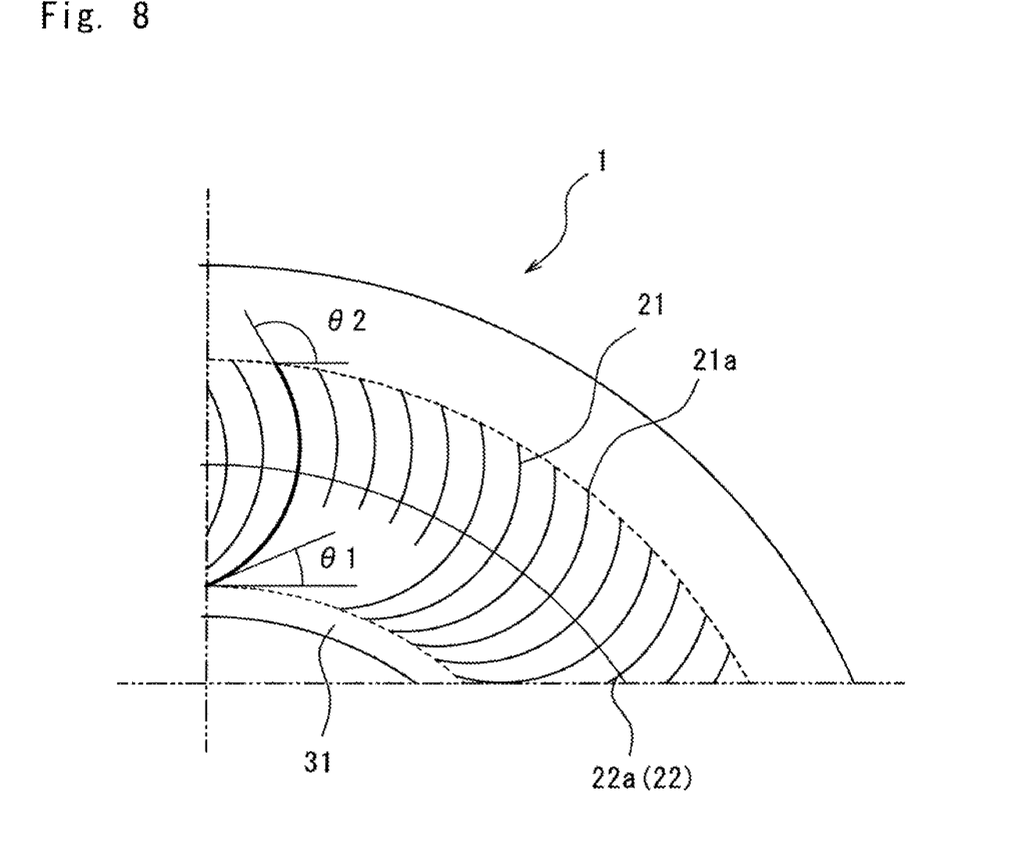
FIG. 8 is a schematic partial side view of a pneumatic tire according to Example 1.
Figure 9:
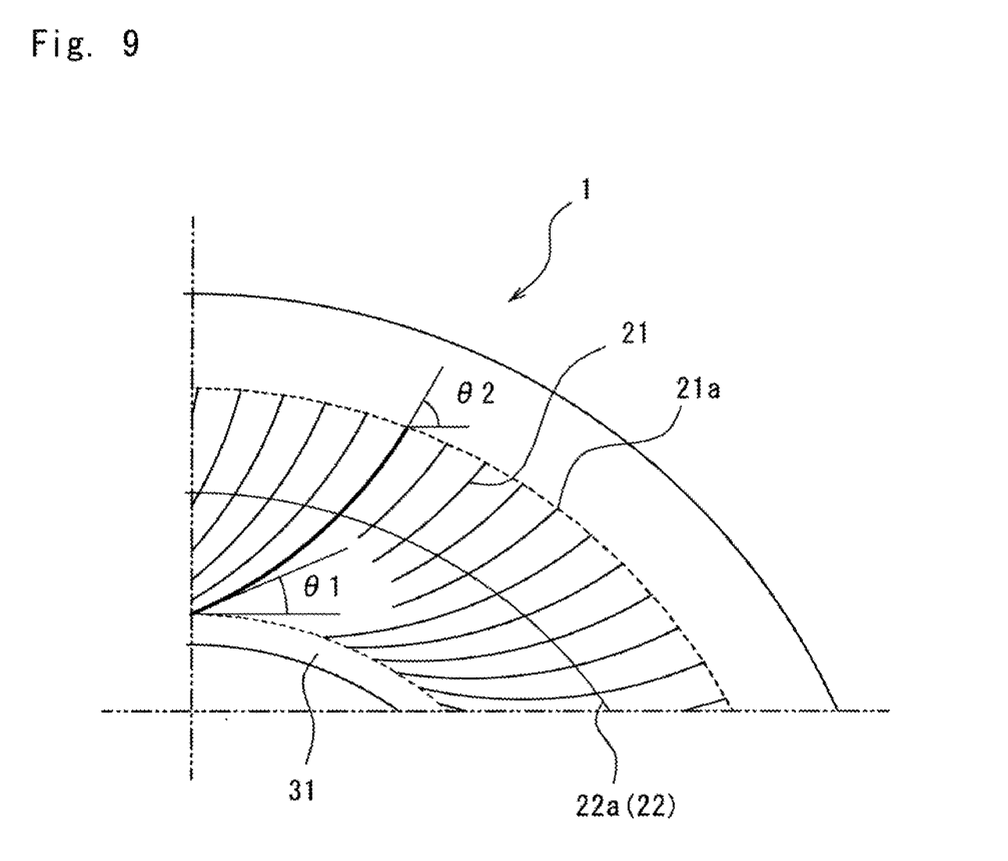
FIG. 9 is a schematic partial side view of a pneumatic tire according to Example 2.

FIG. 3 is a schematic side view of the tire 1 showing an arrangement of the reinforcing cords 21. FIG. 4 is an enlarged partial view of FIG. 3. FIG. 4 does not show a part of the reinforcing cords 21 for convenience of clarification of the figure. This also applies to FIGS. 5 to 9 which will be referred to below.

The reinforcing cords 21 are spaced away from each other in the tire circumferential direction TC, and are curved in such a manner that each inclination angle with respect to the tire circumferential direction TC gradually increases with nearness to the outside in the tire radial direction TR. The inclination angle with respect to the tire circumferential direction TC refers to the inclination angle of each of the reinforcing cords 21 with respect to the tire circumferential direction TC at an inner end in the tire radial direction TR. A reference line BL1 of an inclination angle θ1 at an inner end of each of the reinforcing cords 21 in the tire radial direction TR is parallel to a reference line BL2 of an inclination angle θ2 at an outer end of each of the reinforcing cords 21 in the tire radial direction TR.

In the present embodiment, the inclination angle θ1 of each of the reinforcing cords 21 at the inner end in the tire radial direction TR is about 20 degrees, while the inclination angle θ2 at the outer end is about 90 degrees. The inclination angles preferably include inclination angles of 45 degrees or larger on the outside in the tire radial direction, and inclination angles smaller than 45 degrees on the inside. A boundary between the outside and the inside in the tire radial direction TR for the inclination angles herein is located at the top portion 22a of the rim protector 22. In other words, the inclination angle is preferably 45 degrees or larger in any region outside the top portion 22a of the rim protector 22 in the tire radial direction TR, and is preferably smaller than 45 degrees in any region on the inside. It is further preferable that the inclination angles vary through 40 degrees or larger. In addition, increasing rates of the inclination angles are equalized, that is, the reinforcing cords 21 form an arcuate shape. However, the increasing rates of the inclination angles are not required to be uniform, but may gradually increase or gradually decrease.

According to the configuration of the present embodiment, following advantages are produced.

(1) In the present embodiment, the inclination angles of the reinforcing cords 21 with respect to the tire circumferential direction TC increase in the outer diameter portion of the tire 1, and decrease in the inner diameter portion. The reinforcing cords 21 are deformed more greatly when a force is applied in the bending direction than in the expansion/contraction direction (longitudinal direction). In this case, rigidity at the portion including the reinforcing cords 21 can be raised more greatly in the longitudinal direction than in the bending direction. In the above configuration, the inclination angles are varied so that the reinforcing cords 21 extend in the tire radial direction TR in the outer diameter portion, and extend in the tire circumferential direction TC in the inner diameter portion. Accordingly, rigidity in the tire radial direction TR (radial rigidity) more greatly increases in the outer diameter portion than in the inner diameter portion, while rigidity in the tire circumferential direction TC (circumferential rigidity) more greatly increases in the inner diameter portion than in the outer diameter portion. In particular, radial rigidity of the outer diameter portion constituting the tread portion greatly contributes to steering stability. Accordingly, steering stability improves with the rise of radial rigidity of the outer diameter portion. Moreover, the respective reinforcing cords 21 are curved so that the inclination angles gradually increase. This arrangement prevents uneven rigidity distribution caused by the reinforcing cords 21, thereby improving riding comfort. In addition circumferential rigidity in the outer diameter portion is prevented from becoming excessively high, and therefore the contact length in the tire circumferential direction TC is prevented from becoming smaller. Accordingly, ground contact pressure is prevented from increasing, and riding comfort further improves.

(2) The inclination angle of each of the reinforcing cords 21 is 45 degrees or larger (maximum angle: 90 degrees in the present embodiment) in the outer diameter portion. Accordingly, a certain level or higher of radial rigidity, and a certain level or lower of circumferential rigidity can be securely acquired. Accordingly, necessary steering stability and riding comfort can be securely obtained.

(3) The inclination angle of each of the reinforcing cords 21 is smaller than 45 degrees (minimum angle: 20 degrees in the present embodiment) in the inner diameter portion. Accordingly, a certain level of lower of radial rigidity can be securely acquired. Accordingly, deterioration of riding comfort caused by excessive increase in radial rigidity is avoidable.

(4) The boundary between the outside and the inside in the tire radial direction TR for the inclination angles is disposed at the top portion 22a of the rim protector 22. Accordingly, radial rigidity at a portion of low radial rigidity can be efficiently raised by the reinforcing cords 21. High rigidity components such as the bead filler 32 and the bead core 31 are disposed on the inner diameter portion with respect to the top portion 22a of the rim protector 22 so that radial rigidity at the inner diameter portion is relatively high. On the other hand, radial rigidity of the outer diameter portion not including such high rigidity components is relatively low. Accordingly, radial rigidity at the portion having relatively low radial rigidity can be efficiently raised by setting the inclination angles to a predetermined value or larger on the outside in the tire radial direction with respect to a boundary located at the top portion 22a of the rim protector 22 as a boundary for the inclination angles, and setting the inclination angles to a predetermined angle or smaller on the inside in the tire radial direction. In this manner, steering stability efficiently improves.

(5) The inclination angles vary through 40 degrees or larger. In this case, at least a certain difference in radial rigidity can be produced between the outer diameter portion and the inner diameter portion. Similarly, at least a certain difference in circumferential rigidity can be produced between the outer diameter portion and the inner diameter portion. In this case, a certain level or higher of radial rigidity and a certain level or lower of circumferential rigidity can be securely acquired in the outer diameter portion. In addition, a certain level or lower of radial rigidity can be acquired in the inner diameter portion. Accordingly, steering stability and riding comfort further securely improve.

(6) The height h1 at the outer end of each of the reinforcing cords 21 in the tire radial direction TR is set in the range from 30% inclusive to 70% inclusive of the tire sectional height H. Accordingly, the reinforcing cords 21 can be disposed at appropriate positions for which radial rigidity improvement is demanded. A range smaller than 30%, which is out of the range of the reinforcing cords 21 described above, is a range originally having a high radial rigidity achieved by the bead core 31, the bead filler 32 and the like. Accordingly, even when the reinforcing cords 21 are disposed only in this range, necessary radial rigidity cannot be acquired in the outer diameter portion. When the reinforcing cords 21 are disposed in a range larger than 70% described above, radial rigidity excessively increases. In this case, riding comfort may deteriorate. Accordingly, when the reinforcing cords are disposed within the appropriate range from 30% inclusive to 70% inclusive, as a range other than the foregoing ranges, appropriate radial rigidity can be acquired.

(7) The folded end 12a of the carcass ply 12, the outer ends 21a of the reinforcing cords 21, and the outer end 32a of the bead filler 32 are disposed in this order from the outside to the inside in the tire radial direction TR. In this case, radial rigidity increases stepwise from the outside toward the inside in the tire radial direction TR. This stepwise rigidity change prevents a considerable local rigidity change, that is, prevents uneven rigidity distribution, thereby improving riding comfort.

(8) The height h2 of the folded end 12a of the carcass ply 12 in the tire radial direction TR is 1.05 times or larger than the tire radial direction height h1 of the outer end 21a of each of the reinforcing cords 21. In this case, the end 12a of the carcass ply 12 and the end 21a of each of the reinforcing cords 21 do not overlap with each other. Accordingly, the stepwise rigidity change is more securely achievable. Moreover, the overlapping amount d between the carcass ply 12 and the belt 13 is limited to 20 mm or smaller. Accordingly, the length of the carcass ply 12 becomes smaller, and therefore the weight and cost can decrease.

EXAMPLE

As shown in following Table 1, steering stability and riding comfort of tires according to Comparative Examples and Examples were evaluated based on indexes on the assumption that respective indexes of Comparative Example 1 are set to 100.

As for steering stability, a test run of a car provided with the tire was carried out at a specified vehicle air pressure, on a dry road surface, with acceleration, brake, turn, and lane change. A specialized driver made sensory evaluation for relative steering stability from viewpoints of marginal performance, response performance, and straight running performance.

As for riding comfort, a test run similar to the above test run for steering stability was carried out. A specialized driver made sensory evaluation for relative riding comfort from viewpoints of shock, vibration, and the like.

The respective indexes of steering stability and riding comfort become preferable as values of the indexes increase.

Concerning a shape of Comparative Example 1, each of the reinforcing cords 21 has a linear shape, and the inclination angle θ1 of 23 degrees. Concerning a shape of Comparative Example 2, each of the reinforcing cords 21 has a linear shape, and the inclination angle θ1 of 90 degrees. Concerning a shape of Comparative Example 3, each of the reinforcing cords 21 has a linear shape, and the inclination angle θ3 of 10 degrees. Concerning a shape of Example 1, each of the reinforcing cords 21 has a curved shape, and an inclination angle gradually increasing with nearness to the outside in the tire radial direction TR in a range from θ1=20 degrees to θ2=90 degrees. Concerning a shape of Example 2, each of the reinforcing cords 21 has a curved shape, and an inclination angle gradually increasing with nearness to the outside in the tire radial direction TR in a range from θ1=20 degrees to θ2=120 degrees. Concerning a shape of Example 3, each of the reinforcing cords 21 has a curved shape, and an inclination angle gradually increasing with nearness to the outside in the tire radial direction TR in a range from θ1=20 degrees to θ2=60 degrees.

TABLE 1

|  | Comparative Example 1 | Comparative Example 2 | Comparative Example 3 |
|---|---|---|---|
| Shape | Linear: 23 degrees | Linear: 90 degrees | Linear: 10 degrees |
| Steering stability | 100 | 105 | 95 |
| Riding comfort | 100 | 95 | 105 |
|  | Example 1 | Example 2 | Example 3 |
| Shape | Curve: 20 to 90 degrees | Curve: 20 to 120 degrees | Curve: 20 to 60 degrees |
| Steering stability | 108 | 106 | 102 |
| Riding comfort | 108 | 105 | 102 |

In any of Examples 1 to 3, the curves of the reinforcing cords 21 produced more preferable steering stability and riding comfort than in Comparative Example 1. Compared with Comparative Examples 2 and 3, preferable results were partially obtained. Particularly, Example 1 produced the best results all the examples, and achieved remarkable effects in each performance.

Although the specific embodiments of the present invention have been described, the present invention is not limited to the above embodiments. Various modifications may be made without departing from the scope of the present invention.

What is claimed is:

1. A pneumatic tire comprising:
a tread portion comprising a tread surface;
a pair of sidewall portions that respectively extend inward in a tire radial direction from both sides of the tread portion in a tire width direction;
a pair of bead portions each comprising a bead core and a bead filler, wherein the bead core is elongated continuously to an inside of the sidewall portion in the tire radial direction and extends continuously in an annular shape in a tire circumferential direction, and the bead filler is disposed adjacent to the bead core and outside the bead core in the tire radial direction; and
at least one carcass ply folded in each bead portion toward an outside from an inside in the tire width direction, and disposed around the bead core and the bead filler in each bead portion,
wherein reinforcing cords are provided in the bead portions and the sidewall portions so as to be curved such that inclination angles of the reinforcing cords with respect to the tire circumferential direction gradually increase with nearness to an outside in the tire radial direction,
each of the sidewall portions comprises a rim protector that in cross-section tapers to an outermost point in the tire width direction from an outer surface of the sidewall portion, the outermost point being the top portion of the rim protector, the rim protector being continuously formed in an annular shape in the tire circumferential direction,
a boundary of the inclination angles between an outside and an inside in the tire radial direction is located at the top portion of the rim protector,
wherein the inclination angles on the outside in the tire radial direction consist of angles of 45 degrees or larger, the inclination angles on the inside in the tire radial direction consist of angles of smaller than 45 degrees and the inclination angles vary through 40 degrees or larger.

2. The pneumatic tire according to claim 1, wherein an outer end of each of the reinforcing cords in the tire radial direction is disposed in a range from 30% inclusive to 70% inclusive of a tire sectional height.

3. The pneumatic tire according to claim 1,
wherein an arrangement is made in an order of a folded end of the carcass ply, outer ends of the reinforcing cords, and an outer end of the bead filler from an outside to an inside in the tire radial direction.

4. The pneumatic tire according to claim 3, further comprising
a belt that extends in the tire width direction inside the tread portion, wherein
on each side of the tread portion a height of the folded end of the at least one of carcass ply in the tire radial direction is 1.05 times or more than a height of the outer end of each of the reinforcing cords in the tire radial direction,
the folded end of the at least one of carcass ply and the belt partially overlap with each other, and
an overlapping amount between the folded end of the at least one of carcass ply and the belt is 20 mm or smaller.

* * * * *